US011657389B2

(12) United States Patent
Eng et al.

(10) Patent No.: US 11,657,389 B2
(45) Date of Patent: May 23, 2023

(54) DATA INPUT USING MULTI-FACTOR AUTHENTICATION

(71) Applicant: PayPal, Inc., San Jose, CA (US)

(72) Inventors: Nelson Eng, San Francisco, CA (US); Abhishek Chhibber, Sunnyvale, CA (US)

(73) Assignee: PayPal, Inc., San Jose, CA (US)

( * ) Notice: Subject to any disclaimer, the term of this patent is extended or adjusted under 35 U.S.C. 154(b) by 106 days.

(21) Appl. No.: 16/729,031

(22) Filed: Dec. 27, 2019

(65) Prior Publication Data
US 2021/0203648 A1 Jul. 1, 2021

(51) Int. Cl.
*G06Q 20/40* (2012.01)
*G06Q 20/38* (2012.01)
*H04L 9/40* (2022.01)

(52) U.S. Cl.
CPC ....... *G06Q 20/382* (2013.01); *G06Q 20/4014* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 7,908,645 B2 | 3/2011 | Varghese et al. | |
| 8,234,220 B2 * | 7/2012 | Weiss | G06Q 20/3676 705/68 |
| 8,751,801 B2 | 6/2014 | Harris et al. | |
| 8,881,977 B1 | 11/2014 | Paczkowski et al. | |
| 8,925,062 B1 | 12/2014 | Brezinski et al. | |
| 9,947,011 B2 * | 4/2018 | Kortina | G06Q 20/227 |
| 10,417,634 B1 * | 9/2019 | Strand | G06Q 20/42 |
| 2018/0255054 A1 * | 9/2018 | Oberheide | H04W 12/06 |
| 2019/0377864 A1 * | 12/2019 | Mossoba | G06F 3/0622 |
| 2020/0106764 A1 * | 4/2020 | Hockey | H04L 9/3213 |
| 2020/0265423 A1 * | 8/2020 | Alves | G06Q 20/4012 |

OTHER PUBLICATIONS

Adukkathayar, "Secure Multifactor authentication payment system using NFC", 10th International Conference on CS & Education, Jul. 2015. (Year: 2015).*

* cited by examiner

*Primary Examiner* — Abdulmajeed Aziz
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to a method that includes, in response to a request from a user to complete a secure transaction, determining, by a computer system, that a plurality of transaction options is available for completing the secure transaction. The method further includes generating, by the computer system, a plurality of authentication codes, each authentication code of the plurality corresponding to a respective one of the plurality of transaction options. Receiving a particular authentication code of the plurality of authentication codes from a computing device associated with the user causes a selection of a corresponding transaction option.

20 Claims, 7 Drawing Sheets

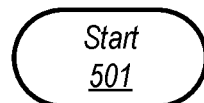

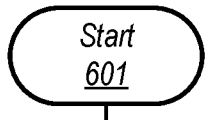

*600*

```
Start
601
```

↓ receiving, from a user, a request to perform a secure transaction for which a plurality of transaction options is available for completing the secure transaction.
610

↓ generating a plurality of authentication codes corresponding to the plurality of transaction options;
620

↓ causing the plurality of authentication codes to be displayed on a user screen.
630

↓ receiving an indication of an entry of a particular authentication code from the user.
640

↓ sending the particular authentication code to a server computer system to cause the server computer system to complete the secure transaction using a particular transaction option that corresponds to the particular authentication code.
650

↓

```
End
690
```

FIG. 6

DATA INPUT USING MULTI-FACTOR AUTHENTICATION

BACKGROUND

Technical Field

This disclosure relates generally to computer system operation, and more particularly to multi-factor authentication techniques.

Description of the Related Art

Web services, such as cloud computing, banking, email, shopping, and the like, frequently require their users to authenticate their identity prior to allowing users access to private accounts associated with a given web service. This authentication typically includes a user providing login credentials (e.g., a username and a corresponding password) to gain access to the user's account. Some web services utilize multi-factor authentication to increase a level of security for the user's account by requiring one or more additional steps before granting access to the user's account. For example, a typical two-step authentication process includes a first step of a user entering valid login credentials and, if the login credentials are successfully verified, a second step of the user entering a secondary codeword. This secondary codeword may be randomly generated and valid for a single use. After receiving a valid codeword, the web service may allow the user to access the associated account.

BRIEF DESCRIPTION OF THE DRAWINGS

FIG. 5 illustrates a flow diagram of a method for selecting a transaction option using an authentication code, according to some embodiments.

FIG. 6 shows a flow diagram of another method for selecting a transaction option using an authentication code, according to some embodiments.

DETAILED DESCRIPTION

Multi-factor authentication may be used by a variety of web service providers to protect the providers and their users from unauthorized use of a user's account. Use of multi-factor authentication may be an option provided to users to implement an increased level of security for their accounts. Multi-factor authentication requires a user that is attempting to access an account to not only know the correct login credentials for the account but to also have access to a secondary codeword that may be random and may change periodically. The codeword, in various embodiments, may be sent to an authorized user of the account (e.g., by email or text message), or may be generated by a device or application registered by the authorized user for use with their account.

While some users may appreciate the additional level of security provided by use of multi-factor authentication, other users may opt out of usage due to the additional burden placed on the user to access and enter the secondary codeword after having already successfully entered their login credentials. To encourage use of multi-factor authentication, the present inventors have recognized the desirability of a technique that can provide an additional benefit to users when using multi-factor authentication. Apparatus and methods are described herein for utilizing a secondary codeword to pre-select from a plurality of options associated with a user's account.

Figure 1:
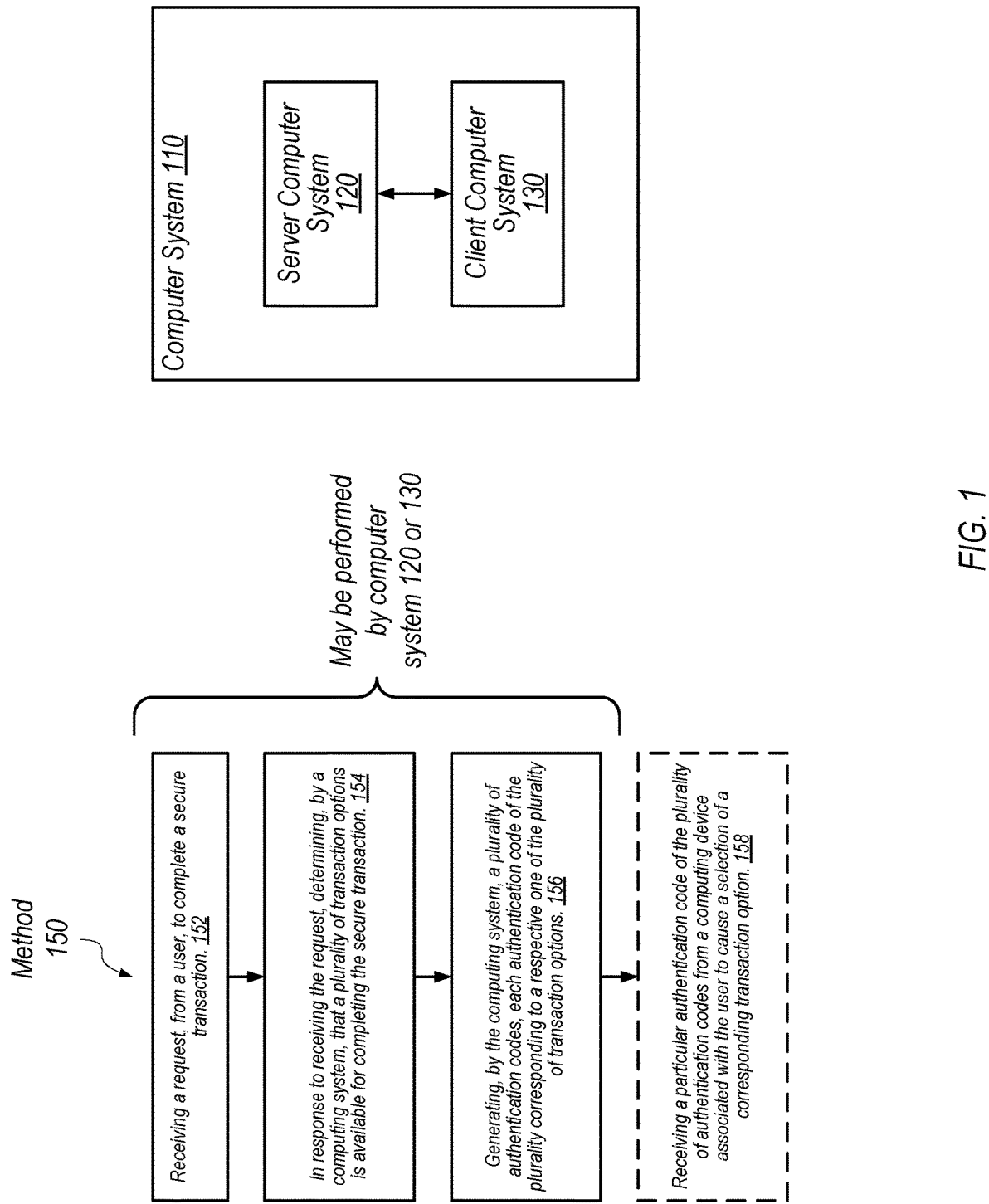
FIG. 1 includes a block diagram and a flow diagram illustrating an example system for using an authentication code to determine a transaction option, according to some embodiments.

A block diagram of an embodiment of a computer system and a method for operating the computer system are shown in FIG. 1. Computer system 110 includes server computer system 120 and client computer system 130. Method 150 is a flow diagram of a method for authenticating a secure transaction in computer system 110. A secure transaction is initiated by a user of client computer system 130, the secure transaction to be performed by server computer system 120. Method 150 includes operations that are performed by computer system 110 to authenticate the secure transaction.

As illustrated, computer system 110 includes two or more computer systems that are coupled through a network, such as a local area network (e.g., a private WiFi network) or a wide area network (e.g., the Internet). Server computer system 120 includes one or more computers that are used to implement a web service. The web service includes performing secure transactions that are initiated by a user of client computer system 130. Client computer system 130 is any suitable computing device that the user may utilize to access the web service on server computer system 120. For example, client computer system 130 may be a desktop computer, a laptop computer, a smartphone, a tablet, a wearable device (e.g., a smart watch), a home virtual assistant device (e.g., a smart speaker), and the like.

Secure transactions may include a variety of actions, for example, logging into a user account on the web service, a private communication between the user and a third party, a transfer of files that contain sensitive information, launch of a cloud-based application for use by the user, a transfer of monetary funds of the user, and the like. For any of these examples, server computer system 120 does not perform a secure transaction requested by a particular user until the particular user has been authenticated as authorized to perform the requested transaction.

In addition, a secure transaction may have two or more transaction options available for completing the transaction. For example, when logging into a user account for a social media web service, transaction options may include a choice of screens to display initially, such as a home screen, recent news feed, new post screen, messaging screen, and other such options. As another example, when initiating a financial transaction, transaction options may include one of a plurality of payment options, such as a choice of one or more credit cards, a direct draft from a bank account, use of a saved balance credited to the account, and the like.

Method 150 includes operations that allow a user of client computer system 130 to select a particular transaction option as part of an authentication process with a web service implemented on server computer system 120. In some embodiments, method 150 is included as part of a multi-factor authentication process.

Method 150 includes, at block 152, receiving a request, from a user, to complete a secure transaction. As illustrated, a user of client computer system 130 initiates a request for to complete a secure transaction. The request is received by both client computer system 130 and server computer system 120. Client computer system 130 receives the request via one or more input devices coupled to client computer system 130. In some embodiments, an application or background process associated with the web service is running on client computer system 130. This application or process may receive the request from an operating system, input device drivers, or another application running on client computing system 130. Server computer system 120 receives the request from client computer system 130. The requested secure transaction may be any suitable transaction, such as the examples disclosed above. For example, the secure transaction may correspond to a request to login to a particular user account, the request including login credentials provided by the user.

At block 154, the method includes, in response to receiving the request, determining, by a computer system, that a plurality of transaction options is available for completing the secure transaction. As shown, computer system 110 receives the secure transaction request and determines whether any options are available for completing the transaction. For example, a process running on server computer system 120 or an application associated with the web service running on client computer system 130 determines that the request corresponds to a request to login to a particular user account. The user provides login credentials (e.g. a username and password), and computer system 110 accesses the particular user account to identify any login options are available. In some embodiments, options may correspond to one or more account services that are enabled for the particular user account. For example, a cloud computing service may offer a variety of account services such as personal computer backups, photo/media storage, cloud-based applications, and so forth. Identified transaction options in such an embodiment include options to start, after completing the login procedure, a session in one of the identified services. As stated, the determination of the plurality of transaction options, in various embodiments, is performed by either of server computer system 120 or client computer system 130.

Method 150 further includes, at block 156, generating, by the computer system, a plurality of authentication codes, each authentication code of the plurality corresponding to a respective one of the plurality of transaction options. As illustrated, computer system 110 uses multi-factor authentication to validate that the user is actually authorized to access the particular user account. Instead of generating a single authentication code as part of the multi-factor authentication process, computer system 110 generates a respective authentication code for each identified transaction option. In some embodiments, each authentication code is generated based on a random value. For example, computer system 110 may use a pseudo-random number generation technique to generate a random number for each authentication code. In other embodiments, each authentication code is generated based on two or more known or otherwise repeatable values. For example, computer system 110 may use a hashing algorithm to generate the authentication codes from a keyword and a current time of day.

As used herein, "random" refers to use of an algorithm or other suitable technique to generate values in an order that is not easily repeatable. It is noted that some randomizing techniques, commonly referred to as "pseudo-random," may not result in a truly random pattern, and may therefore, be repeatable under controlled conditions. Use herein of "random" generation of values include both truly random and pseudo-random techniques.

The authentication code may be the random number or may be a different number generated using the random number and a particular value. An identifier, for example, for each of the plurality of transaction options may be encoded within a respective one of the plurality of authentication codes. This identifier for each of the plurality of transaction options may be a respective keyword, and the encoding includes using a hashing algorithm on each of the respective keywords. In such an embodiment, the keyword for a particular transaction option is hashed with the random number to generate the authentication code corresponding to that particular transaction option.

If server computer system 120 generates the plurality of authentication codes, then server computer system 120 sends a message to a computing device associated with the user, the message including the plurality of authentication codes. In some embodiments, server computer system 120 sends the message directly to client computer system 130, from which the request was originally received. In other embodiments, the message is sent in an email to an email address and/or in a text message to a mobile device number, the email address and mobile device number being associated with a particular user account associated with the secure transaction request.

If client computer system 130 generates the plurality of authentication codes, then client computer system 130 causes the plurality of authentication codes to be displayed on a computing device associated with the user. Client computer system 130 receives an indication of an entry of the particular authentication code from the user, such as a mouse click, a tap to a touch screen, a keyboard entry, and the like. client computer system 130 may then send the indicated authentication code to server computer system 120.

At block 158, method 150 includes receiving a particular authentication code of the plurality of authentication codes from a computing device associated with the user causes a selection of a corresponding transaction option. In some embodiments, server computer system 120 receives the particular authentication code from client computer system 130. As disclosed above, client computer system 130 may generate the plurality of authentication codes and after receiving an indication of a selection of one of the authentication codes, the indicated authentication code is sent to server computer system 120. In other embodiments, the user receives an email or a text message that includes the plurality of authentication codes, along with an indication of which transaction option corresponds to each authentication code, and then uses client computer system 130 to enter a selected authentication code. In other embodiments, the user may send the selected authentication code to server computer system 120 using a mobile device that receives the text message, or that has an application associated with the web service, the mobile device being different than client computer system 130.

Server computer system 120, after receiving the indication of the selected authentication code, completes the secure transaction using the transaction option that corresponds to the selected authentication code. For example, if the selected authentication code corresponds to an option to start a session in a new post screen of a social media web service, then a user interface for creating a new post in the social media service is displayed for the user. If, for example, the selected authentication code corresponds to an option to make a payment using a particular credit card, then the amount of the secure transaction is charged to the particular credit card.

In some embodiments, computer system 110 may generate a trap authentication code, wherein receiving the trap authentication code from the computing device associated with the user causes the secure transaction to be denied. As an extra layer of security for the user, when the plurality of authentication codes is generated, one or more additional codes may be generated that do not correspond to any of the identified plurality of transaction options. As used herein, a "trap authentication code," or simply a "trap code," refers to an invalid authentication code that, if used in place of a valid authentication code, causes the secure transaction to be denied. If a hacker or other unauthorized user manages to receive the plurality of authentication codes, then there is a possibility that the unauthorized user may select one of the one or more trap codes. The trap codes are presented along with the valid authorization codes as corresponding to a seemingly valid transaction option (referred to herein as a trap option). The trap option is, however, known by an authorized user as not being an available option. For example, the trap option may correspond to a payment type that is not associated with the authorized user, or selects a session option that the authorized user has not enabled for their account.

It is noted that the method and system presented in FIG. 1 is merely an example for demonstrating the disclosed concepts. In other embodiments, computer system 110 may include additional devices, such as a mobile device of the user. Method 150 may include additional operations that are not illustrated, such as sending a plurality of authentication codes generated by the server computer system to a mobile device of the user.

Figure 2:
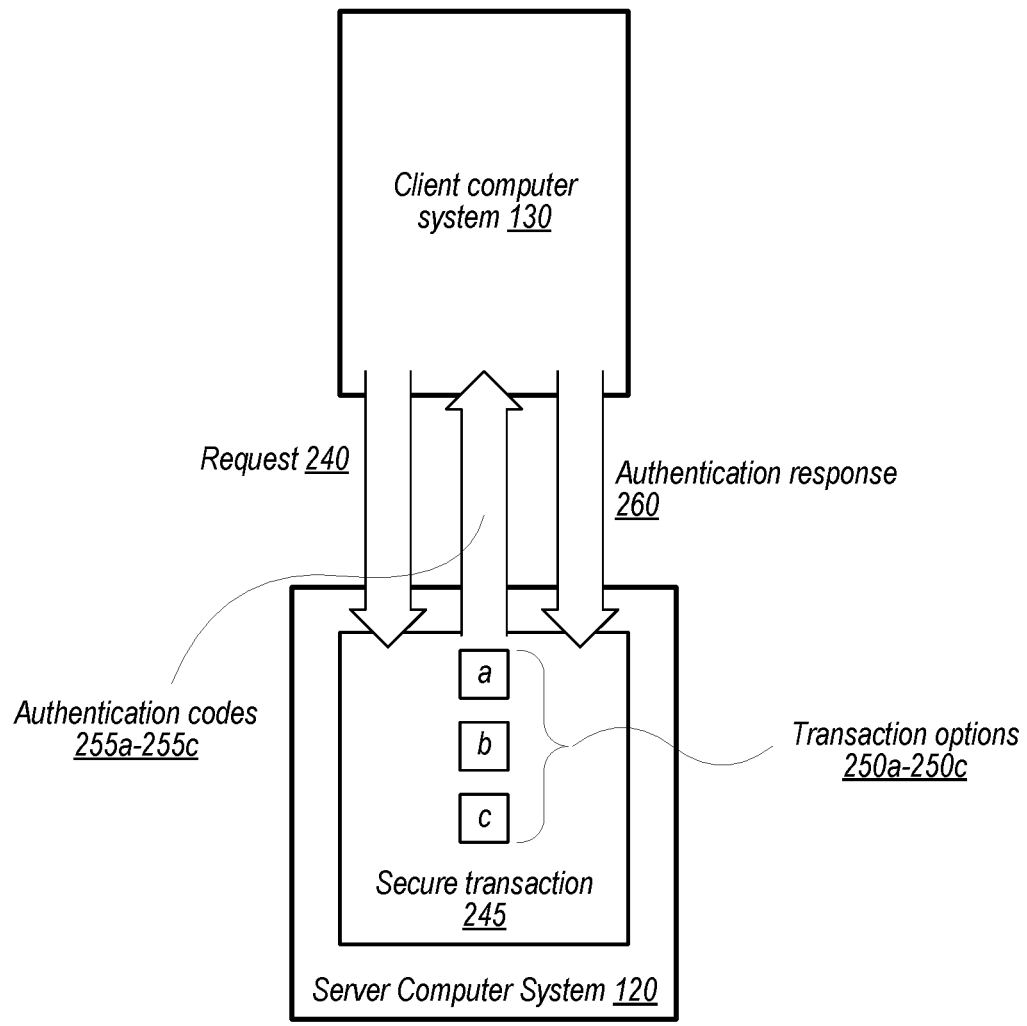
FIG. 2 is a block diagram illustrating an example system for performing secure transactions, according to some embodiments.
Figure 3:
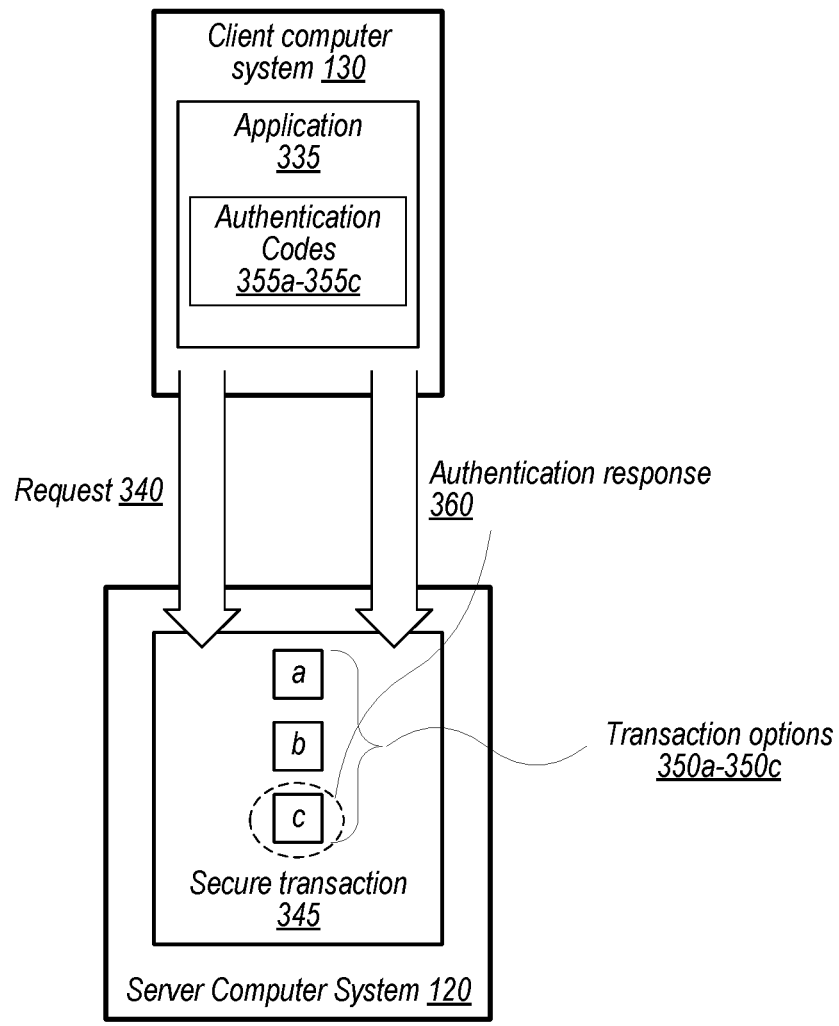
FIG. 3 shows a block diagram illustrating another example system for performing secure transactions, according to some embodiments.
Figure 4:
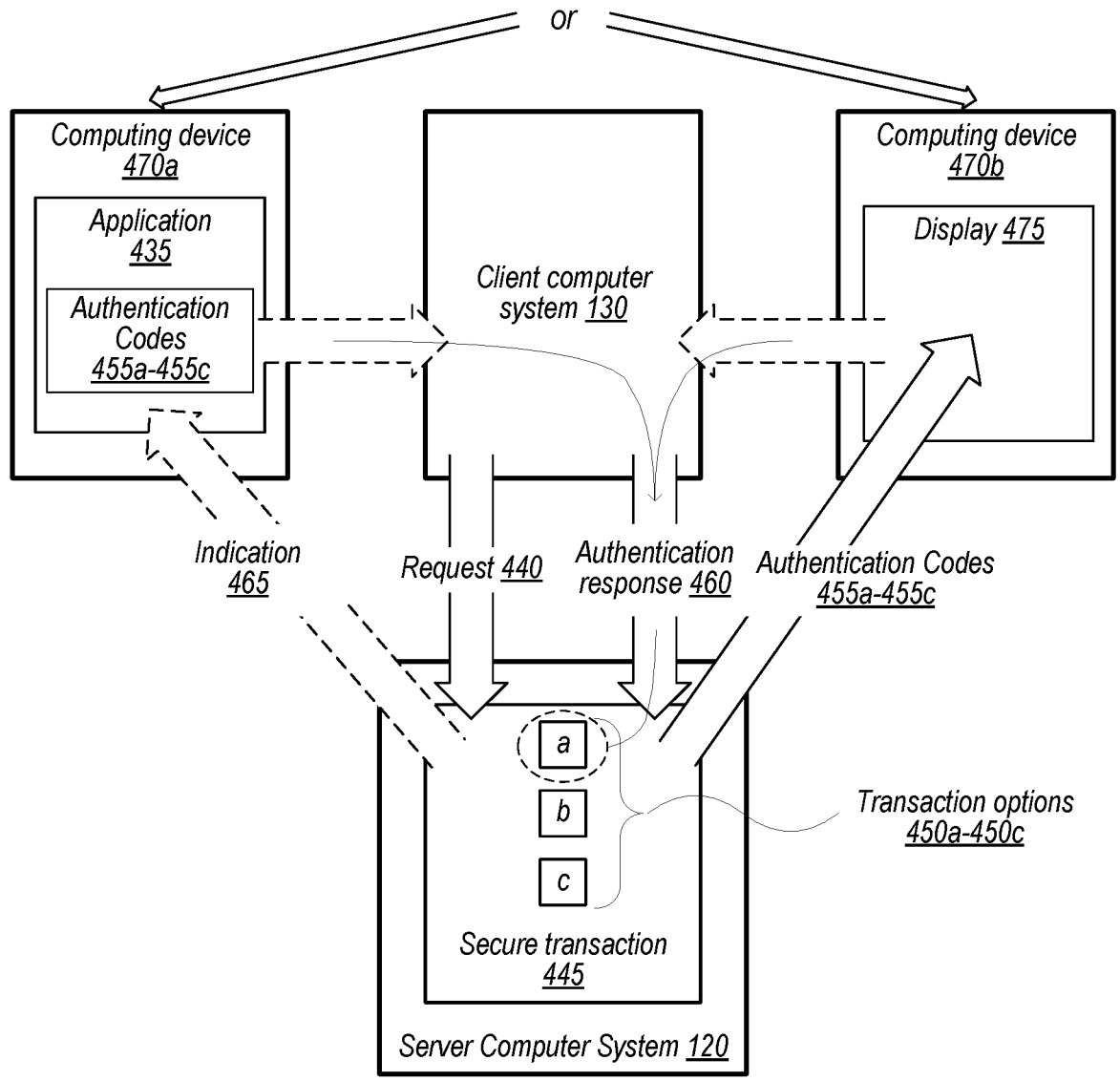
FIG. 4 depicts a block diagram illustrating additional examples of systems for performing secure transactions, according to some embodiments.

As disclosed above in regards to FIG. 1, the disclosed concepts may be implemented in a variety of embodiments. Particular operations may be performed by one or more computing devices included in the example computer system. FIGS. 2-4 illustrate several examples of such embodiments.

Moving to FIG. 2, a block diagram of an embodiment of a transaction system is shown. Transaction system 200 includes server computer system 120 and client computer system 130. As shown, client computer system 130 is utilized by a user to request secure transaction 245 be performed by a web service implemented on server computer system 120. Transaction options 250a-250c may be used in conjunction with the performance of secure transaction 245.

Server computer system 120 receives, from the user of client computer system 130, request 240 to perform secure transaction 245. Transaction options 250a-250c are available for completing secure transaction 245. Secure transaction 245 may correspond to any suitable type of transaction, including the various secure transactions disclosed above. Server computer system 120 identifies that transaction options 250a-250c are available for performing secure transaction 245. For example, server computer system 120 may identify transaction options 250a-250c from an account profile associated with the user. Transaction options 250a-250c may include various account services with which to start a login transaction, various forms of payment for a financial transaction, various shipping addresses for an online shopping transaction, and the like.

In response to request 240 and after identifying transaction options 250a-250c, server computer system 120 generates authentication codes 255a-255c, each one corresponding to a respective one of transaction options 250a-250c. In some embodiments, the web service implemented on server computer system utilizes a multi-factor authentication procedure to verify an identity of the user before the user is allowed access to the web service. In such embodiments, server computer system 120 generates the authentication codes 255a-255c in response to determining that credentials associated with the user have been successfully verified. For example, request 240 may include a submission of the user's credentials for verification. In other embodiments, the user may already be logged into a session on the web service, and server computer system 120 verifies that this session is still active (e.g., a time limit for the session has not expired).

As disclosed above, authentication codes 255a-255c are generated using a random technique. In some embodiments, authentication codes 255a-255c are generated using both a randomly generated value and a different keyword value. The generation of authentication codes 255a-255c may include generating a single random value and then hashing the random value with three different keywords, each keyword associated with a different one of transaction options 250a-250c. In other embodiments, the generation of authentication codes 255a-255c may include generating a random value for each of transaction options 250a-250c and hashing each random value with a single keyword associated with the user. In further embodiments, a different random value and different keyword may be used to generate each authentication code 255a-255c.

In response to generating authentication codes 255a-255c, server computer system 120 sends authentication codes 255a-255c to a computing device associated with the user. As shown in FIG. 2, server computer system 120 sends authentication codes 255a-255c to client computer system 130. The authentication codes may be sent using any suitable messaging technique, such as by email or text message. In some embodiments, the web service implemented on server computer system 120 may have an available application that the user installs on client computer system 130 and authentication codes 255a-255c are transferred from server computer system 120 to the application on client computer system 130.

Server computer system 120 receives an authentication response from the user via client computer system 130. The user is presented with authentication codes 255a-255c on client computer system 130, for example, by reading an email that includes the authentication codes. The user may also be presented with a description of the respective transaction option 250a-250c that corresponds to each authentication code 255a-255c. The user selects a particular one of authentication codes 255a-255c corresponding to the desired one of transaction options 250a-250c. The selection may be made using any suitable technique, such as typing the selected code in a corresponding field in a user interface displayed on client computer system 130, or by clicking or tapping on the desired code if the authentication codes are presented in the user interface. the selected one of authentication codes 255a-255c is sent to server computer system 120 as authentication response 260.

In response to receiving authentication response 260, server computer system 120 determines that authentication response 260 corresponds to a particular transaction option of transaction options 250a-250c. Server computer system 120 maintains copies of the authentication codes 255a-255c that were sent to client computer system 130. Authentication response 260 is compared to authentication codes 255a-

255c. In response to determining that authentication response 260 matches a particular one of authentication codes 255a-255c, server computer system 120 completes secure transaction 245 using the particular transaction option that corresponds to the matching authentication code.

In some embodiments, authentication codes 255a-255c may expire after a particular amount of time. Use of an expired authentication code may result in secure transaction 245 being denied. In some embodiments, server computer system 120 may generate and send a new set of authentication codes. In such embodiments, the user may be prompted to initiate the generation of the new set of codes, allowing the user to opt out of receiving a new set of codes if the user no longer wishes to proceed with secure transaction 245. In various embodiments, authentication codes 255a-255c may or may not be usable for multiple transaction. For example, server computer system 120 receives, from the user, a different request to perform a different secure transaction for which the plurality of transaction options 250a-250c is available. Server computer system 120 determines that a particular amount of time has elapsed since generating authentication codes 255a-255c, indicating that authentication codes 255a-255c have expired. In response to receiving a particular one of authentication codes 255a-255c, server computer system 120 denies the different request to perform the secure transaction.

In some embodiments, once server computer system 120 receives of one of authentication codes 255a-255c, all three authentication codes 255a-255c are invalidated, even if an expiration time has not elapsed. Such one-time use codes may provide a higher level of security compared to allowing reuse of authentication codes.

It is noted that FIG. 2 is one example illustrating disclosed concepts. Transaction system 200 has been simplified for clarity. In other embodiments, additional blocks may be included, such as network devices to couple the client computer system to the server computer system, and the server computer system may include a plurality of computer systems to implement the web service. In some embodiments, the number of transaction options may differ from the three that are illustrated.

Turning to FIG. 3, another embodiment of a transaction system is depicted. Transaction system 300 shows a different implementation of the disclosed concepts. In a similar manner as described in FIG. 2, transaction system 300 includes server computer system 120 and client computer system 130. In FIG. 3, a user uses application 335 on client computer system 130 to request secure transaction 345 be performed by a web service implemented on server computer system 120. Transaction options 350a-350c may be used in conjunction with the performance of secure transaction 345. The techniques disclosed below may be used in conjunction with a multi-factor authentication procedure.

As illustrated, client computer system 130 receives, from a user, request 340 to perform secure transaction 345 for which a plurality of transaction options 350a-350c is available for completing secure transaction 345. The user may utilize application 335, or a different application running on client computer system 130, to generate request 340. In one embodiment for example, the user may use a web browser to access a web service implemented on server computer system 120, and while accessing the web service, initiate request 340 for performing secure transaction 345. In other embodiments, application 335 may be an application associated with the web service and the user utilizes application 335 to generate request 340. Client computer system 130 receives request 340 from the web browser or from application 335 and sends the request to server computer system 120.

In response to receiving request 340, or in response to other input from the user, client computer system 130 generates a plurality of authentication codes corresponding to the plurality of transaction options. In some embodiments, application 335 may be a web browser that the user utilizes for accessing the web service. This web browser may include an add-on module (referred to as an extension or plug-in by various web browser developers) that generates authentication codes 355a-355c. In other embodiments, application 335 is a program for accessing the web service without a web browser. Using any of the previously described techniques, application 335 generates authentication codes 355a-355c, each of which corresponds to a respective one of transaction options 350a-350c. As described above, application 335 may further generate a trap code as an extra security precaution. If authentication codes 355a-355c are part of a multi-factor authentication procedure, then client computer system 130 may generate authentication codes 355a-355c in response to determining that the user is currently logged into client computer system 130, into application 335 specifically, and/or into the web service implemented on server computer system 120.

Application 335 further causes authentication codes 355a-355c (and, if applicable, the trap code) to be displayed on a user screen coupled to client computer system 130. Authentication codes 355a-355c are displayed along with an indication of the corresponding transaction option 350a-350c. The indication may include a brief or detailed description of the corresponding option or may be a single character for which the user knows the corresponding option. In some embodiments, authentication codes 355a-355c expire after a particular amount of time. In response to determining that the particular amount of time has elapsed, client computer system 130 (through execution of application 335) causes authentication codes 355a-355c to be cleared from the user screen. Furthermore, in response to an indication from the user, application 335 generates a different plurality of authentication codes corresponding to transaction options 350a-350c, and causes the different plurality of authentication codes to be displayed on the user screen.

If a trap code is included, application 335 displays an unavailable transaction option with the trap code. This unavailable option may be selected to have similar characteristics as one or more of transaction options 350a-350c. For example, secure transaction 345 may be an online purchase and transaction options 350a-350c are various delivery addresses, such as home, work, and post office box. The displayed option for a trap code may be a second home or spouse work address. The order in which authentication codes are displayed may be varied for each secure transaction. Varying the order in which the codes are displayed may provide an increase in protection against spyware, such as keystroke recorders and touch sensor recorders, that may be, unknowingly to the user, executing on client computer system 130.

In some embodiments, indications of transaction options 350a-350c may not be displayed. Instead, a predefined order may be used such that the user is aware of the corresponding transaction option 350a-350c based on the order that authentication codes 355a-355c (and optionally a trap code) are presented on the display. For example, the transaction option that corresponds to the home address may always be presented first, office second and so forth. Omitting the indication of the corresponding transaction option may increase a level of security if an unauthorized user gains access to client computer system 130.

Client computer system 130 receives an indication of an entry of a particular authentication code from the user. The user may select a particular one of authentication codes 355*a*-355*c* by clicking on, tapping on, or typing in the desired selection. In some embodiments, an audio interface may be utilized to verbally select the particular authentication code. Client computer system 130 sends the particular authentication code to server computer system 120 to cause server computer system 120 to complete secure transaction 345 using the particular transaction option that corresponds to the particular authentication code. Client computer system 130 sends the selected one of authentication codes 355*a*-355*c* to server computer system 120 as authentication response 360.

Server computer system 120 receives authentication response 360 that includes the selected one of authentication codes 355*a*-355*c*. In the embodiment of FIG. 3, authentication codes 355*a*-355*c* are generated by client computer system 130, not server computer system 120. Accordingly, server computer system 120 utilizes a suitable method for recreating authentication codes 355*a*-355*c* for comparison to authentication response 360. For example, client computer system 130 and server computer system 120 may share one or more keywords that are used to generate authentication codes 355*a*-355*c*, or client computer system 130 and server computer system 120 may share a single keyword and use a different hashing function to generate each authentication code. Each hashing function is associated with a particular transaction option by both computer systems. In some embodiments, sharing of keywords and/or hashing functions occurs between server computer system 120 and client computer system 130 before secure transaction 345 is requested. In other embodiments, keywords and/or indications of particular hashing functions may be shared after request 340 is received by server computer system 120. Since the value of authentication response 360 is different from any particular one keyword, security of secure transaction 345 may be maintained.

It is noted that transaction system 300 is merely an example. The elements shown have been limited to those used to demonstrate the disclosed concepts. In other embodiments, additional or a different combination of elements may be included. For example, in some embodiments, another application (e.g., a web browser), in addition to application 335, may be included on the client computer system for communicating with the server computer system.

Proceeding to FIG. 4, another embodiment of a transaction system is depicted. Transaction system 400 shows two different implementations of the disclosed concepts. In a similar manner as described above in regards to transaction systems 200 and 300, transaction system 400 includes server computer system 120 and client computer system 130. In addition, transaction system 400 includes two embodiments of a computing device associated with a user, computing devices 470*a* and 470*b*. A user requests, using client computer system 130, secure transaction 445 be performed by a web service implemented on server computer system 120. Transaction options 450*a*-450*c* are available for use in conjunction with the performance of secure transaction 445. The techniques described below may be used in conjunction with a multi-factor authentication procedure.

As previously disclosed, client computer system 130 is any suitable computing device for communicating with server computer system 120 to access the web service. Computing devices 470*a* and 470*b*, as illustrated, are separate computing devices from client computer system 130 that are each capable of receiving information from server computer system 120. For example, client computer system 130 may be a desktop or laptop computer, and computing devices 470*a* and 470*b* are mobile devices. It is noted that in the following descriptions, either computing device 470*a* or 470*b* is used. Use of both computing devices is not required.

Transaction system 400 authenticates secure transactions using similar procedures as described for transaction systems 200 and 300. Transaction system 400, however, adds another device into the procedure, computing devices 470*a* and 470*b*, two techniques for which are described as follows. In regards to use of computing device 470*a*, a user initiates secure transaction 445 by sending request 440 to server computer system 120, in a similar manner as previously disclosed. In response to identifying transaction options 450*a*-450*c* are available for use with secure transaction 445, server computer system 120 may send indication 465 to computing device 470*a*. Indication 465 does not include authentication codes 455*a*-455*c*, but, in some embodiments, may include one or more keywords or other values for use by application 435 to generate authentication codes 455*a*-455*c*. In other embodiments, indication 465 is simply a value used to indicate that authentication codes 455*a*-455*c* are to be generated.

Computing device 470*a*, receives indication 465, indicating that the user has initiated secure transaction 445, and activates application 435 causing application 435 to generate authentication codes 455*a*-455*c*, each corresponding to a respective one of transaction options 450*a*-450*c*. Application 435 uses any of the techniques disclosed above for generating authentication codes 455*a*-455*c*, including optional generation of a trap code.

Computing device 470*a* causes authentication codes 455*a*-455*c* to be displayed on a screen of computing device 470*a*. As described above, each of authentication codes 455*a*-455*c* may be displayed with an indication of a corresponding one of transaction options 450*a*-450*c*. Client computer system 130 receives an indication of an entry of a particular one of authentication codes 455*a*-445*c* from the user. For example, the user types the particular authentication code into a user interface field displayed on a screen coupled to client computer system 130. The particular authentication code is sent to server computer system 120 as authentication response 460. Server computer system 120 processes authentication response 460 as previously described, and if authentication response 460 corresponds to a valid authorization code, processes secure transaction 445 with the appropriate one of transaction options 450*a*-450*c*.

In regards to use of computing device 470*b*, server computer system 120 receives request 440 as described. Instead of (or in some embodiments, in addition to) sending indication 465, server computer system 120 generates authentication codes 455*a*-455*c* as previously described in regards to FIG. 2. Authentication codes 455*a*-455*c* (as well as a trap code, if applicable) are sent to computing device 470*b*. Server computer system 120 may use a text message, an email message, a message to a particular application installed on computing device 470*b*, or any other suitable procedure for sending authentication codes 455*a*-455*c* to computing device 470*b*. Once received, computing device 460*b* causes authentication codes 455*a*-455*c* to be displayed on a user screen coupled to computing device 470*b*, such as display 475. The user may select a particular one of authentication codes 455*a*-455*c* and enter the selected authentication code into a user interface presented by client computer system 130. Server computer system 120 receives the selected code as authentication response 460 and proceeds to process secure transaction 445 accordingly.

In some embodiments, server computer system 120 may cause client computer system to present a choice of how the user would like to generate authentication codes 455a-455c. For example, server computer system 120 may indicate, on the user interface on client computer system 130, that the user may receive authentication codes 455a-455c via an email, text, or other messaging technique, or application 435 may be used to generate authentication codes 455a-455c. In some embodiments, if application 435 is selected, the user may prompt application 435 to generate authentication codes 455a-455c rather than receiving indication 465.

It is noted that the embodiment of FIG. 4 is an example. Variations of the disclosed embodiment are contemplated, including various combinations of features disclosed in regards to FIGS. 1-4. For example, if the user selects to receive the authentication codes via an email, the email sent by server computer system 120 may be read from a variety computing devices, including client computer system 130, computing devices 470a and 470b, as well as any computing device capable of communication with the appropriate email server.

Transaction systems as described above in regards to FIGS. 1-4, may be operable to perform a variety of methods. FIGS. 5-6, described below, provide examples of such methods.

Moving now to FIG. 5, a flow diagram illustrating an example method 500 for implementing option choices with authentication codes is depicted, according to some embodiments. In various embodiments, method 500 may be performed by a server computer system, such as server computer system 120 of FIGS. 1-4. For example, server computer system 120 may include (or have access to) a non-transitory, computer-readable medium having program instructions stored thereon that are executable by the server computer system to cause the operations described with reference to FIG. 5. In FIG. 5, method 500 includes elements 501-590. Referring collectively to FIGS. 2 and 5, method 500 begins in block 501.

At 510, in the illustrated embodiment, method 500 includes receiving, from a user of a client computer system, a request to perform a secure transaction for which a plurality of transaction options is available for completing the secure transaction. Server computer system 120 receives, from a user of client computer system 130, request 240 to perform secure transaction 245 on a web service implanted on server computer system 120. Secure transaction 245 may correspond to any suitable transaction for which a user authentication is desired. For example, secure transaction 245 may be a request to transfer funds from an account of the user to an account of a receiving entity. The plurality of transaction options (e.g., transaction options 250a-250c) may correspond to various financial accounts the user has available for funding the transfer (e.g., credit cards, bank accounts, gift card balances, credit balance, and the like). Server computer system 120 may identify the plurality of transaction options from an account profile associated with the user in the user's account in the web service.

In some embodiments, to perform secure transaction 245 server computer system performs a multi-factor authentication process to verify that the user is authorized to access services of the web service, including performance of secure transaction 245. The multi-factor authentication process includes sending of credentials by the user to server computer system 120, followed by the user sending a particular authentication code to server computer system 120. Since multiple transaction options 250a-250c are available for performing secure transaction 245, server computer system generates a respective authentication code for each transaction option 250a-250c. Server computer system 120 may generate authentication codes 255a-255c in response to determining that credentials associated with the user have been successfully verified. Server computer system 120 sends, in response to the generating, authentication codes 255a-255c to a computing device associated with the user, such as client computer system 130 or, as shown in FIG. 4, computing device 470b.

Method 500, at block 520, includes receiving an authentication response from the user via the client computer system. The user is presented with authentication codes 255a-255c, as well as the corresponding transaction options 250a-250c. The user selects the one of authentication codes 255a-255c that corresponds to the desired one of transaction options 250a-250c. Using an interface displayed on a screen coupled to client computer system 130, the user indicates the selected authorization code and client computer system 130 sends the selected authentication code to server computer system 120 as authentication response 260.

Method 500 further includes, at block 530, determining that the authentication response corresponds to a particular transaction option of the plurality of transaction options. Server computer system 120 maintains copies of authentication codes 255a-255c that are sent to client computer system 130. In response to receiving authentication response 260, server computer system compares authentication response 260 to the stored authentication codes 255a-255c. If a match to one of the authentication codes 255a-255c is determined, then the method moves to block 540 to perform secure transaction 245. Otherwise, secure transaction 245 may be rejected, or the user may be asked if server computer system 120 is to generate a new set of authentication codes. In some embodiments, authentication codes 255a-255c expire after a particular amount of time. In such embodiments, the stored copies of authentication codes 255a-255c may be erased or replaced with a default value indicating the codes have expired. As with a non-matching authentication response 260, secure transaction 245 may be denied or new codes may be generated.

At block 540, method 500 further includes completing, by the server computer system, the secure transaction using the particular transaction option. Server computer system, in response to determining that authentication response 260 matches one of authentication codes 255a-255c and the codes are still valid, performs secure transaction using the one of transaction options 250a-250c that correspond to the matched authentication code. The method ends in block 590. In some embodiments, method 500 is repeated in response to a new request for a secure transaction.

It is noted that the illustrated example of method 500 includes elements 501-590. While these elements are shown in a particular order for ease of understanding, other orders may be used and additional elements may be included. For example, one or more additional blocks may be included before block 520, such as generating the authentication codes and sending the authentication codes to the client computer system.

Proceeding now to FIG. 6, a flow diagram illustrating another example of a method for implementing option choices with authentication codes is depicted, according to some embodiments. In various embodiments, method 600 may be performed by a client computer system, such as client computer system 130 of FIGS. 1-4. For example, client computer system 130 may include (or have access to) a non-transitory, computer-readable medium having program instructions stored thereon that are executable by the server computer system to cause the operations described with reference to FIG. 6. Method 600 includes elements 601-690. Referring collectively to FIGS. 3 and 5, method 600 begins in block 601.

Method 600, at block 610, includes receiving, from a user, a request to perform a secure transaction for which a plurality of transaction options is available for completing the secure transaction. As described above, the user initiates request 340 to perform secure transaction 345 by a web service implemented on server computer system 120. In some embodiments, client computer system 130 receives request 340 from an input device used by the user. In other embodiments, client computer system may receive an indication of request 340 from server computer system 120 in response to the user initiating secure transaction 345. For example, the user may utilize a web browser to interface with server computer system 120 and thereby, send request 340 to the web service. Client computer system 130 may, therefore, have no indication that request 340 has been sent. In some embodiments, the user may directly indicate to client computer system 130, via application 335, that request 340 has been sent. In other embodiments, server computer system 120 may send the indication to client computer system 130 in response to receiving request 340.

At block 620, method 600 includes generating a plurality of authentication codes corresponding to the plurality of transaction options. Client computer system 130, through use of application 335, generates authentication codes 355a-355c. The authentication codes are generated using any suitable technique disclosed above. In some embodiments, the plurality of authentication codes is part of a multi-factor authentication procedure. In such embodiments, client computer system 130 generates the plurality of authentication codes in response to determining that the user is currently logged into client computer system 130, and/or server computer system 120. In addition, client computer system 130 may generate a trap authentication code that does not correspond to any of the plurality of transaction options. If client computer system 130 sends the trap authentication code to server computer system 120, then server computer system 120 may cause secure transaction 345 to be denied.

Method 600 further includes, at block 630, causing the plurality of authentication codes to be displayed on a user screen. Application 335, in response to generating authentication codes 355a-355c, causes authentication codes 355a-355c to be displayed on a screen coupled to client computer system 130. Transaction options 350a-350c (or indications thereof) may be presented for the corresponding authentication codes 355a-355c to enable the user to determine which authentication code corresponds to a given transaction option.

As disclosed previously, authentication codes 355a-355c may expire after a particular amount of time, in some embodiments. In response to determining that the particular amount of time has elapsed, application 335 causes authentication codes 355a-355c to be cleared from the user screen. In response to an indication from the user, application 335 generates a different plurality of authentication codes corresponding to transaction options 350a-350c, and then causes the different plurality of authentication codes to be displayed on the user screen. For example, the user may be prompted by application 335, after the particular amount of time elapses, to indicate if the different plurality of authentication codes is to be generated. The user has an option to not generate the different plurality of authentication codes, which may further cause server computer system 120 to deny and cancel secure transaction 345.

Method 600 also includes, at block 640, receiving an indication of an entry of a particular authentication code from the user. The user, after being presented with authentication codes 355a-355c and their respective transaction options, selects one of authentication codes 355a-355c. The selection may be indicated to client computer system 130 using any suitable method of accepting user input, such as by keyboard, mouse, touchscreen, microphone, and the like.

At block 650, method 600 further includes sending the particular authentication code to a server computer system to cause the server computer system to complete the secure transaction using a particular transaction option that corresponds to the particular authentication code. In response to the selecting, by the user, of the particular authentication code, client computer system 130 sends the selected authentication code as authentication response 360. After receiving authentication response 360, server computer system 120 determines if the included authentication code matches a valid one of authentication codes 355a-355c and if so, performs the secure transaction using the corresponding transaction option. The method ends in block 690. Method 600 may, in some embodiments, be repeated in response to a new request for a secure transaction.

It is noted that the illustrated example of method 600 includes elements 601-690. While these elements are shown in a particular order for ease of understanding, other orders may be used and additional elements may be included. For example, an additional block may be included after block 530 for clearing the displayed authentication codes in response to an expiration time elapsing. In addition, it is contemplated that elements of methods 500 and 600 may be combined in other embodiments, such as for operating transaction system 400 in FIG. 4.

Figure 7:
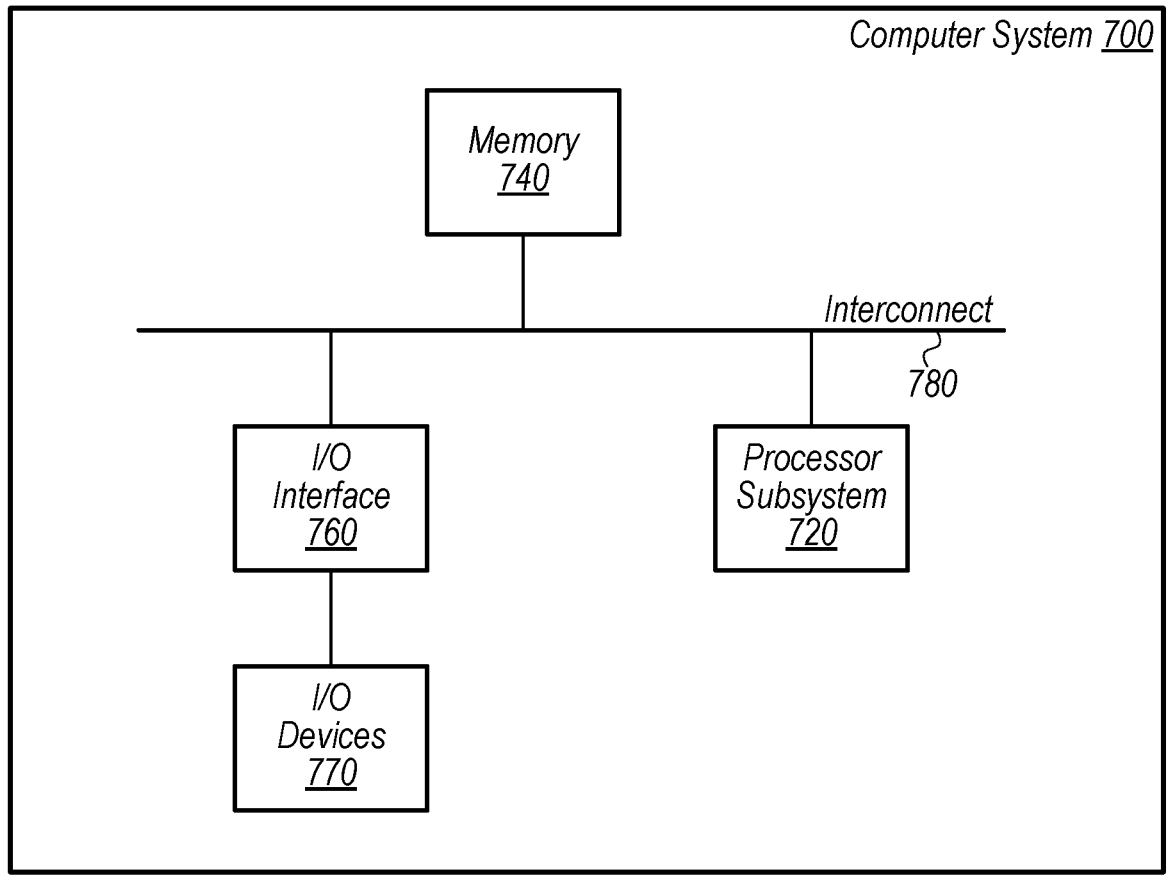
FIG. 7 is a block diagram illustrating an example computer system, according to some embodiments.

Referring now to FIG. 7, a block diagram of an example computer system 700 is depicted, which may implement one or more computer systems, such as server computer system 120 and/or client computer system 130 of FIGS. 1-4, according to various embodiments. In some embodiments, computer system 700 may also be used to implement computing devices 470a and 470b in FIG. 4. Computer system 700 includes a processor subsystem 720 that is coupled to a system memory 740 and I/O interfaces(s) 760 via an interconnect 780 (e.g., a system bus). I/O interface(s) 760 is coupled to one or more I/O devices 770. Computer system 700 may be any of various types of devices, including, but not limited to, a server computer system, personal computer system, desktop computer, laptop or notebook computer, tablet computer, handheld computer, smart phone, smart device, etc. Although a single computer system 700 is shown in FIG. 7 for convenience, computer system 700 may also be implemented as two or more computer systems operating together.

Processor subsystem 720 may include one or more processors or processing units. In various embodiments of computer system 700, multiple instances of processor subsystem 720 may be coupled to interconnect 780. In various embodiments, processor subsystem 720 (or each processor unit within 720) may contain a cache or other form of on-board memory. One or more processors in processor subsystem 720 may be configured to execute instructions stored in memory 740 or in the cache or other on-board memory, causing the one or more processors to perform operations, such as various combinations of the methods presented above.

System memory 740 is usable to store program instructions executable by processor subsystem 720 to cause computer system 700 to perform various operations described herein. System memory 740 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as system memory 740. Rather, computer system 700 may also include other forms of storage such as cache memory in processor subsystem 720 and secondary storage on I/O devices 770 (e.g., a hard drive, storage array, etc.). In some embodiments, these other forms of storage may also store program instructions executable by processor subsystem 720.

I/O interfaces 760 may be any of various types of interfaces configured to couple to and communicate with other devices, according to various embodiments. In one embodiment, I/O interface 760 is a bridge chip (e.g., Southbridge) from a front-side to one or more back-side buses. I/O interfaces 760 may be coupled to one or more I/O devices 770 via one or more corresponding buses or other interfaces. Examples of I/O devices 770 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 770 includes a network interface device (e.g., configured to communicate over WiFi, Bluetooth, Ethernet, etc.), and computer system 700 is coupled to a network via the network interface device.

I/O devices 770 also includes, in some embodiments, various peripherals for user input and output. Keyboards, computer mice, track-balls, touch pads, touch screens, and microphones are examples of I/O devices 770 that are capable of enabling user input to computer system 700. Monitors, touch screens, audio speakers, and headphones are examples of I/O devices 770 that are capable of enabling output from computer system 700 to a user. In various embodiments, such I/O devices 770 may be included within computer system 700 or may be coupled to computer system 700 via an appropriate interface port such as universal serial bus (USB), high-definition multimedia interface (HDMI), audio jack, and the like.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "modules" operable to perform designated functions are shown in the figures and described in detail above (e.g., rule-tuning module 112, data analysis module 210, etc.). As used herein, the term "module" refers to circuitry configured to perform specified operations or to physical, non-transitory computer-readable media that stores information (e.g., program instructions) that instructs other circuitry (e.g., a processor) to perform specified operations. Such circuitry may be implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority hereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for protecting multi-factor authentication codes against spyware, comprising:
in response to a request from a user to complete a secure transaction using a web service, initiating a multi-factor authentication procedure to verify an identity of the user;
in response to successfully verifying, by comparing submitted user credentials to recorded user credentials stored in a memory circuit as a first step of the multi-factor authentication procedure, the identity of the user, accessing, by a computer system, a user account associated with the submitted user credentials to determine that a plurality of transaction options is available for completing the secure transaction, wherein the plurality of transaction options include options provided by the web service to the user;
generating, by the computer system as a part of the multi-factor authentication procedure, a plurality of authentication codes, each authentication code of the plurality corresponding to a respective indication of one of the plurality of transaction options, wherein each authentication code is usable one time;
adding, to the plurality of authentication codes, at least one trap authentication code with a corresponding unavailable transaction option;
encoding, by the computer system in response to the request, an identifiable keyword for each of the plurality of transaction options into each of the plurality of authentication codes;
sending, by the computer system to a computing device associated with the user, the plurality of authentication codes and respective indications of the corresponding plurality of transaction options, wherein the sending causes an order in which the plurality of authentication codes and the respective indications are presented on a screen of the computing device to vary between secure transactions;
receiving, by the computer system as a second step of the multi-factor authentication procedure, an entry indication of a particular authentication code from the user; and
processing, by the web service in response to receiving the particular authentication code, the secure transaction using the corresponding transaction option based on the particular authentication code.

2. The method of claim 1, further comprising, in response to determining that a particular amount of time has elapsed, causing the plurality of authentication codes to be cleared from the screen of the computing device of the user.

3. The method of claim 2, further comprising:
in response to input from the user, generating a different plurality of authentication codes corresponding to the plurality of transaction options; and
causing the different plurality of authentication codes to be displayed on the computing device.

4. The method of claim 1, wherein the sending of the plurality of authentication codes and the respective indications of the corresponding plurality of transaction options to the computing device is performed via a text message.

5. The method of claim 1, wherein the encoding includes using a hashing algorithm on each of the respective identifiable keywords.

6. The method of claim 1, wherein, in response to determining that the entry indication of the particular authentication code is the trap authentication code, the processing includes denying the secure transaction.

7. The method of claim 1, further comprising generating, by the computer system, a different plurality of authentication codes in response to determining that a particular amount of time has elapsed.

8. The method of claim 7, further comprising denying, by the computer system, the secure transaction in response to determining that the particular amount of time has elapsed before the particular authentication code is received.

9. A non-transitory computer-readable medium having instructions stored thereon that are executable by a server computer system of a web service to perform operations, comprising:
  in response to receiving, from a user of a client computer system, a request to perform a secure transaction via the web service, verifying an identity of the user using a multi-factor authentication procedure;
  in response to successfully verifying, in a first step of the multi-factor authentication procedure, the identity of the user, accessing an account of the user to identify a plurality of valid transaction options is available for completing the secure transaction, wherein the plurality of valid transaction options include options provided by the web service to the user;
  generating, using a respective identifiable keyword for each of the plurality of valid transaction options, a plurality of authentication codes, wherein each of the plurality of authentication codes correspond respectively to ones of the plurality of valid transaction options, and wherein at least one of the plurality of authentication codes is a trap authentication code with a corresponding unavailable transaction option;
  sending, by the server computer system to a computing device associated with the user, the plurality of authentication codes and respective indications of the corresponding plurality of transaction options, wherein the sending causes an order in which the plurality of authentication codes and the respective indications are presented on a screen of the computing device to vary between secure transactions;
  receiving, as a second step of the multi-factor authentication procedure, a particular one of the authentication codes in an authentication response;
  in response to determining that the authentication response corresponds to a particular valid transaction option of the plurality of valid transaction options, completing, by the web service, the secure transaction using the particular valid transaction option; and
  invalidating the plurality of authentication codes after the particular authentication code is received.

10. The non-transitory computer-readable medium of claim 9, wherein the operations further comprise, in response to determining that a particular amount of time has elapsed, causing the plurality of authentication codes to be cleared from the screen of the computing device.

11. The non-transitory computer-readable medium of claim 10, wherein the operations further comprise:
  in response to input from the user, generating a different plurality of authentication codes corresponding to the plurality of valid transaction options and the unavailable transaction option; and
  causing the different plurality of authentication codes to be displayed on the screen of the computing device.

12. The non-transitory computer-readable medium of claim 9, wherein the operations further comprise presenting the unavailable transaction option for the trap authentication code as a seemingly valid one of the plurality of authentication codes.

13. The non-transitory computer-readable medium of claim 9, wherein the operations further comprise:
  receiving, from the user, a different request to perform a second secure transaction for which the plurality of valid transaction options is available;
  determining that a particular amount of time has elapsed since generating the plurality of authentication codes; and
  in response to receiving a particular one of the plurality of authentication codes, denying the different request to perform the second secure transaction.

14. The non-transitory computer-readable medium of claim 9, wherein the operations further comprise generating the plurality of authentication codes includes encoding the respective identifiable keyword using a hashing algorithm.

15. A system for protecting multi-factor authentication codes against spyware, comprising:
  a memory; and a
  processor configured to execute instructions stored in the memory, causing the processor to perform operations including:
    in response to receiving, from a user, a request to perform a secure transaction using a web service, verifying an identity of the user using a multi-factor authentication procedure;
    in response to successfully verifying, in a first step of the multi-factor authentication procedure, the identity of the user, determining a plurality of transaction options is available for completing the secure transaction, wherein the plurality of transaction options include options provided by the web service to the user;
    generating, as a part of the multi-factor authentication procedure, a plurality of authentication codes corresponding to the plurality of transaction options, wherein each authentication code of the plurality is generated using a respective identifiable keyword that is associated with a corresponding one of the plurality of transaction options, wherein the authentication codes are usable one time;
    including, with the plurality of authentication codes, at least one trap authentication code with a corresponding unavailable transaction option;
    sending, to a device of the user, the plurality of authentication codes and respective indications of the corresponding plurality of transaction options;
    causing the plurality of authentication codes and the respective indications to be displayed on a screen of the device of the user, wherein an order in which the plurality of authentication codes and the respective indications are displayed varies between secure transactions;
    receiving, as a second step of the multi-factor authentication procedure, an indication of an entry of a particular authentication code from the user; and
    in response to a determination that the particular authentication code is valid and is not a trap authentication code, sending the particular authentication code to a server computer system of the web service to cause the server computer system to complete the secure transaction using a particular transaction option that corresponds to the particular authentication code.

16. The system of claim 15, wherein the operations further include identifying the plurality of transaction options from an account profile associated with the user.

17. The system of claim 15, wherein the operations further include displaying the unavailable transaction option for the trap authentication code as a seemingly valid one of the plurality of transaction options.

18. The system of claim 15, wherein the operations further include, in response to determining that a particular amount of time has elapsed, causing the plurality of authentication codes to be cleared from the screen of the device of the user.

19. The system of claim 18, wherein the operations further include:
- in response to input from the user, generating a different plurality of authentication codes corresponding to the plurality of transaction options; and
- causing the different plurality of authentication codes to be displayed on the screen of the device of the user.

20. The system of claim 15, wherein receiving the request to perform the secure transaction includes receiving, from the server computer system, an activation indication that the user has initiated the secure transaction.

\* \* \* \* \*